(12) United States Patent
Zhang et al.

(10) Patent No.: US 12,116,746 B2
(45) Date of Patent: Oct. 15, 2024

(54) CONSTRUCTION METHOD OF FAST-SETTING POLYMER GROUTING FOR RAPID CONTROL OF SLOPE EROSION AND LANDSLIDE

(71) Applicant: Fujian Geological Engineering Survey Institute, Fuzhou (CN)

(72) Inventors: Zhichao Zhang, Fuzhou (CN); Xuefeng Tang, Fuzhou (CN); Kan Liu, Fuzhou (CN); Longzhen Ye, Fuzhou (CN); Yunlin Yang, Fuzhou (CN); Zhaoxu Guo, Fuzhou (CN); Changguang Qi, Fuzhou (CN); Rufa Huang, Fuzhou (CN)

(*) Notice: Subject to any disclaimer, the term of this patent is extended or adjusted under 35 U.S.C. 154(b) by 164 days.

(21) Appl. No.: 17/811,841

(22) Filed: Jul. 11, 2022

(65) Prior Publication Data

US 2023/0009242 A1    Jan. 12, 2023

(30) Foreign Application Priority Data

Jul. 9, 2021   (CN) .......................... 202110778965.3

(51) Int. Cl.
  *E02D 17/20*   (2006.01)
  *A01G 20/00*   (2018.01)
  (Continued)

(52) U.S. Cl.
  CPC ............ *E02D 17/202* (2013.01); *A01G 20/00* (2018.02); *E02D 5/34* (2013.01); *E02D 5/808* (2013.01);
  (Continued)

(58) Field of Classification Search
  CPC ....... E02D 17/207; E02D 17/202; E02D 5/34; E02D 5/808; E02D 2200/1685;
  (Continued)

(56) References Cited

U.S. PATENT DOCUMENTS

2011/0103898 A1* 5/2011 Wang .................. E02D 3/12
                                                                  405/266
2014/0314494 A1* 10/2014 Wang .................. E02D 17/04
                                                                  405/229

FOREIGN PATENT DOCUMENTS

CN        105926651 A  *  9/2016  ............. E02D 17/20
CN        110485441 A  *  11/2019
CN        111042161 A  *  4/2020  ............. E02D 15/04

* cited by examiner

*Primary Examiner* — Frederick L Lagman
*Assistant Examiner* — Stacy N Lawson
(74) *Attorney, Agent, or Firm* — Hemisphere Law, PLLC; Zhigang Ma (57) ABSTRACT

A construction method of fast-setting polymer grouting for rapid control of slope erosion and landslide. This solution includes a landslide control method and a slope erosion control method: sorting out an operation platform; drilling and grouting of polymer high-pressure jet grouting piles on the diseased slope; drilling a row of grouting water interception holes densely on the rear edge of the diseased slope; drilling, on the operation platform, a plurality of anchor holes on the diseased slope; inserting a ground anchor into each anchor hole and performing polymer grouting to form a polymer anchorage body; laying a steel wire gauze on the surface of the diseased slope, and connecting and fixing the steel wire gauze with the tail end of each ground anchor; spraying a two-component expandable polymer grouting material onto the steel wire gauze to form a polymer anti-scour layer; drilling a plurality of planting holes on the diseased slope with a backpack drill through meshes of the steel wire gauze; and filling each planting hole with grass seed mixed nutrient soil. The present invention has the advantages of short construction period, ecological and environmental protection, convenient construction, high strength and strong scour resistance.

10 Claims, 5 Drawing Sheets

(51) Int. Cl.
*E02D 5/34* (2006.01)
*E02D 5/80* (2006.01)

(52) U.S. Cl.
CPC .... *E02D 17/207* (2013.01); *E02D 2200/1685* (2013.01); *E02D 2250/0023* (2013.01); *E02D 2250/003* (2013.01); *E02D 2300/0004* (2013.01); *E02D 2300/0034* (2013.01); *E02D 2600/30* (2013.01)

(58) Field of Classification Search
CPC .... E02D 2250/0023; E02D 2250/0003; E02D 2300/0004; E02D 2300/0034; E02D 2600/30; A01G 20/00
See application file for complete search history.

CONSTRUCTION METHOD OF FAST-SETTING POLYMER GROUTING FOR RAPID CONTROL OF SLOPE EROSION AND LANDSLIDE

CROSS-REFERENCE TO RELATED APPLICATION

This application claims the benefit and priority of Chinese Patent Application Number 202110778965.3, filed on Jul. 9, 2021. The entire disclosure of each of the foregoing applications is incorporated herein by reference in its entirety.

BACKGROUND OF THE PRESENT INVENTION

Field of Invention

The present invention relates to the field of geological disaster control, in particular to a construction method of fast-setting polymer grouting for rapid control of slope erosion and landslide.

Description of Related Arts

With the continuous advancement of urbanization and a large number of engineering constructions, the original landforms and vegetation coverage of a large number of mountains have been severely damaged, and many man-made exposed slopes have appeared. As a shallow geological disaster phenomenon, slope erosion easily occurs under the actions of rainstorms, gravity, etc., and even deep geological disasters such as landslide are triggered in serious circumstances, threatening the safety of human life more seriously.

However, judging from previous engineering control experience, currently there is no completely effective method that can thoroughly and quickly eradicate such slope disasters from shallow to deep. In addition, for large-scale slope erosion areas, the construction efficiency is also the most critical, which is also the focus of the present invention, that is, a brand new feasible way is provided for the ecological control of slope erosion and landslide by the most rapid and convenient means.

Therefore, there is an urgent need for a construction method for controlling slope erosion and landslide with a short construction period, convenient construction and high strength.

SUMMARY OF THE PRESENT INVENTION

The objective of the present invention is to solve the above problems existing in the prior art, and to provide a construction method of fast-setting polymer grouting for rapid control of slope erosion and landslide.

In order to achieve the above objective of the present invention, the present invention adopts the following technical solution: a construction method of fast-setting polymer grouting for rapid control of slope erosion and landslide includes a landslide control method and a slope erosion control method.

The landslide control method includes the following steps:
  cleaning a diseased slope to form an operation platform;
  positioning a polymer high-pressure jet grouting pile machine with dual-channel high-pressure grouting pipes on the operation platform;
  ejecting two-component fast-setting expandable polymer slurries from two channel outlets respectively of the dual-channel high-pressure grouting pipes, and grouting the two-component fast-setting expandable polymer slurries to each of a plurality of drilled holes on the diseased slope, to cut surrounding soil mass around the drilled hole, so that the polymer slurries rapidly expand and solidify to form a polymer high-pressure jet grouting pile in each of the drilled holes, in order to compact and reinforce the soil mass;
  during the grouting, lifting the dual-channel high-pressure grouting pipes at a set speed, maintaining elevation for a set time when bottoms of the dual-channel high-pressure grouting pipes are located at a sliding surface, and then continuing to lift the dual-channel high-pressure grouting pipes;
  stopping the grouting when bottom elevations of the dual-channel high-pressure grouting pipes reach the surface elevation of the diseased slope, thereby completing construction of the polymer high-pressure jet grouting pile on the diseased slope;
  drilling a row of grouting water interception holes on a rear edge of the diseased slope, wherein two of the adjacent grouting water interception holes form a through connection; and
  grouting each grouting water interception hole to form an impermeable polymer water interception plate, wherein the thickness of the polymer water interception plate is consistent with a diameter of the grouting water interception holes.

The slope erosion control method includes the following steps:
  drilling a plurality of anchor holes on the diseased slope with a twist drill on the operation platform, wherein the holes are arranged in squares;
  inserting a ground anchor into each anchor hole and performing polymer grouting to form a polymer anchorage body, wherein the grouting material is also the two-component fast-setting expandable polymer material;
  laying a steel wire gauze on the surface of the diseased slope, connecting and fixing the steel wire gauze with a tail end of each ground anchor, and arranging a plurality of spacers between the steel wire gauze and the surface of the diseased slope so that there are gaps for polymer filling between the steel wire gauze and the surface of the diseased slope;
  spraying the two-component fast-setting expandable polymer material onto the steel wire gauze to form a polymer anti-scour layer;
  drilling a plurality of planting holes on the diseased slope with a backpack drill through meshes of the steel wire gauze;
  filling each planting hole with grass seed mixed nutrient soil; and
  drilling a plurality of uphill drainage holes from the polymer anti-scour layer.

Further, the construction method further includes covering the operation platform with soil and planting the soil with vegetation of combined arbors, shrubs and grasses, wherein the combined arbors, shrubs and grasses at least include arbors, shrubs, herbs and vines.

Further, the spacing between two adjacent anchor holes is 3 m to 5 m, and each anchor hole has a diameter of 16 mm to 32 mm and a depth of 10 cm to 30 cm; and the planting holes are arranged in rectangles, with a spacing of 1 m to 5 m, a diameter of 10 cm, and a depth of 30 cm to 60 cm.

Further, the operation platform includes at least two operation platforms, the height distance between two adjacent operation platforms is 6 m to 8 m, and the width of each slope operation platform is 3 m to 5 m, for the operation of the polymer high-pressure jet grouting pile machine.

Further, the uphill drainage holes are drilled through the meshes of the steel wire gauze and arranged in a quincunx or rectangular shape with a vertical and horizontal spacing of 3 m to 6 m, and the uphill drainage holes avoid the pile locations of the polymer high-pressure jet grouting piles.

Further, the polymer anti-scour layer has a thickness of 5 cm, and the polymer anti-scour layer around the planting holes is thickened to 10 cm.

Further, the construction method further includes setting a drainage ditch at the foot of the diseased slope, and setting a water interception ditch at the top of the slope.

Further, the polymer high-pressure jet grouting piles have a diameter of 500 mm to 1000 mm, a pile spacing of 3 m to 5 m, and a depth of at least 1 m below the sliding surface.

Further, when each high-pressure jet grouting pile is grouted through the high-pressure jet grouting pipe, a pressure of less than or equal to 18 MPa is used for grouting.

Further, each grouting water interception hole has a spacing of less than 0.2 m and a depth of at least 1 m below the sliding surface.

Beneficial effects: 1. Compared with the prior art, this solution uses a two-component fast-setting expandable polymer material, which can be solidified within ten seconds at the fastest rate, has an expansion ratio of 20:1, can effectively squeeze the anchor holes to enhance anchoring force, cooperates with the holes arranged in squares to form strength quickly so as to greatly shorten the construction period, and therefore, is very suitable for the operation of large-scale disasters such as slope erosion; Meanwhile, the dual-channel high-pressure grouting pipes are lifted at a pre-set rate, which can ensure that more slurry is ejected from the outlets of the dual-channel high-pressure grouting pipes; the slurry stays for a period of set time nearby the sliding surface, so that the high-pressure slurry has enough time to reinforce the weak soil, which can further reinforce the soil at the sliding surface, thereby significantly improving the strength of the entire landslide; the set time and set rate are changed according to the actual operation.

2. Compared with the prior art, different from conventional grouting materials, the polymer grouting material does not contain water, does not reduce the strength of soil mass in the initial stage of grouting, does not bring additional hidden disasters to the fragile slope erosion areas, has a low bulk density after expansion and a small additional load on the fragile diseased slope, and does not affect the stability of the slope.

3. Compared with the prior art, the polymer high-pressure jet grouting piles of the present application are convenient to construct, and the formed piles rapidly expand and solidify to fully compact surrounding soil mass, so as to improve the shear strength of the soil mass; Meanwhile, the formed polymer high-pressure jet grouting piles themselves have high shear strength, and can play a double reinforcing effect on the landslide.

4. Compared with the prior art, the polymer anti-scour layer of the present application has strong adhesion on the rough surface of the diseased slope itself; the steel wire gauze enhances the integrity of the polymer anti-scour layer; the anchoring of the ground anchors further enables the polymer anti-scour layer to adhere to the surface of the diseased slope more firmly, thereby effectively preventing the further development of erosion; and the polymer anti-scour layer has anti-scour and water retention effects, can effectively reduce the evaporation and loss of water in slope erosion areas, and is beneficial to the growth and re-greening of vegetation.

5. Compared with the prior art, the uphill drainage holes of the present application can prevent the diseased slope from being further deteriorated due to the rise of the groundwater level in the rainy season.

6. Compared with the prior art, in the present application, the planting holes are filled with grass seed mixed nutrient soil, which can significantly reduce soil erosion; Meanwhile, the vegetation can root and grow toward the inside of the slope through the planting holes, which is beneficial to vegetation development and slope re-greening, and also exerts the anchoring effect of the root system through the rooting of vegetation, thereby further enhancing the stability of the slope.

7. Compared with the prior art, in the present application, holes can be formed with a backpack drill and a twist drill, so the equipment is light, the construction is simple, a single person can operate on a mountain slope without affecting the stability of the slope.

8. Compared with the prior art, the deep parts of the grass planting holes of the present application are connected with the soil mass of the diseased slope, so that the root system of the vegetation can grow freely.

9. Compared with the prior art, the surface polymer anti-scour layer of the present invention has anti-scour and water retention effects, can effectively reduce the evaporation and loss of water in slope erosion areas with serious soil erosion, and is used for the growth and re-greening of vegetation.

10. Slope erosion is a problem of soil and water loss, and is mainly caused by the erosion of exposed slopes by rainwater and surface water, etc., so surface protection is the key, while the anchorage depth of the ground anchors does not need to be long inside the slope body on the premise that the polymer high-pressure jet grouting piles have ensured the stability of the slope, hence, the present application can complete the anchoring project of the slope erosion mass in a simple and economical manner, and does not need large drilling machinery.

11. This method used for slope erosion control can be combined with traditional water interception and drainage measures, such as water interception ditches and operation platforms at the top of the slope, and drainage ditches and reservoirs at the foot of the slope, which can reduce surface runoff, alleviate hydraulic erosion, ensure the overall stability of the polymer anti-scour layer, and create certain maintenance conditions for the later growth of slope vegetation.

12. Compared with the prior art, the polymer water interception plates of the present application are located at the rear edge of the landslide mass, can be formed quickly and conveniently, and can effectively isolate groundwater infiltration at the rear edge of the landslide mass and prevent the landslide mass from being further deteriorated due to the rise of the groundwater level.

In the figures: 1. Diseased slope; 2. Operation platform; 3. Anchor hole; 4. Ground anchor; 5. Polymer anchorage body; 6. Steel wire gauze; 7. Polymer anti-scour layer; 8. Planting hole; 9. Grass seed mixed nutrient soil; 10. Uphill drainage hole; 11. Drainage ditch; 12. Water interception ditch; 13. Sliding surface; 14. Polymer high-pressure jet grouting pile; 15. Grouting water interception hole; 16. Polymer water interception plate; 17. Drilled hole.

DETAILED DESCRIPTION OF THE PREFERRED EMBODIMENT

A clear and complete description will be made to the technical solutions in the embodiments of the present invention below with reference to the accompanying drawings in the embodiments of the present invention. Apparently, the embodiments described are only part of the embodiments of the present invention, not all of them. Based on the embodiments of the present invention, all other embodiments obtained by those of ordinary skill in the art shall fall within the protection scope of the present invention.

Those skilled in the art should understand that, in the disclosure of the present invention, the orientations or positional relationships indicated by the terms "longitudinal", "lateral", "upper", "lower", "front", "rear", "left", "right", "vertical", "horizontal", "top", "bottom", "inner", "outer", etc. are based on the orientations or positional relationships shown in the accompanying drawings, and are intended to facilitate the description of the present invention and simplify the description only, rather than indicating or implying that the device or element referred to must have a particular orientation or be constructed and operated in a particular orientation, and therefore, these terms cannot be interpreted as limiting the present invention.

Landslide refers to a natural phenomenon that the soil or rock mass on a slope slides down the slope in an overall or scattered manner along a certain weak surface or weak zone under the action of gravity due to the effects of river erosion, groundwater activity, rainwater immersion, earthquake and artificial slope cutting. The moving rock (soil) mass is referred to as a displacement mass or sliding mass, and the unmoved underlying rock (soil) mass is referred to as sliding bed. The diseased slope 1 refers to an entire sliding part of landslide, referred to as the sliding mass.

The sliding surface 13 is one of the important components of landslide landform, and refers to an interface where the diseased slope 1 slides down. The sliding surface is usually steep at the upper part and gentle at the lower part, approximately arc-shaped. Sometimes there is only one sliding surface 13, and sometimes there are a few sliding surfaces, so the sliding surfaces can be divided into primary sliding surfaces and secondary sliding surfaces. The polished surface and scratches can be clearly seen on the sliding surface 13, and sometimes, there are obvious disturbances and drag folds.

As shown in FIGS. 1-4, the construction method of fast-setting polymer grouting for rapid control of slope erosion and landslide includes a landslide control method and a slope erosion control method.

Figure 1:
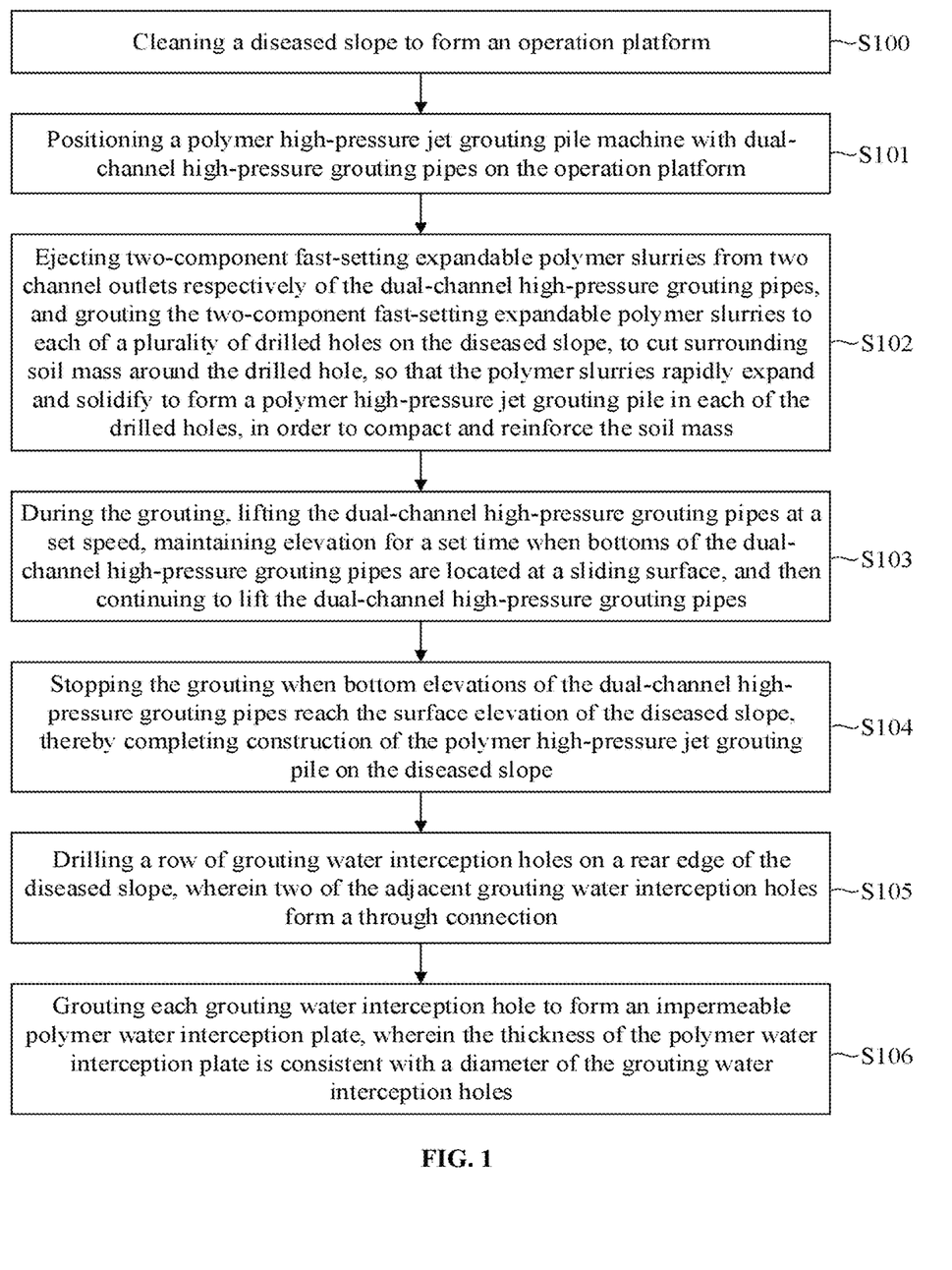
FIG. 1 is a flowchart of a landslide control method of the present invention.

With reference to FIG. 1, the landslide control method includes the following steps.

S100: Cleaning a diseased slope 1 to form an operation platform 2.

In this embodiment, the diseased slope 1 is cleaned and excavated. If possible, a operation platform 2 is excavated every 6 m to 8 m in height, and the operation platforms 2 have a width of 2 m to 4 m and can be used as planting areas of arbors and other plants and construction sites later.

S101: Positioning a polymer high-pressure jet grouting pile machine with dual-channel high-pressure grouting pipes on the operation platform 2.

S102: Ejecting two-component fast-setting expandable polymer slurries from two channel outlets respectively of the dual-channel high-pressure grouting pipes, and grouting the two-component fast-setting expandable polymer slurries to each of a plurality of drilled holes 17 on the diseased slope 1, to cut surrounding soil mass around the drilled hole 17, so that the polymer slurries rapidly expand and solidify to form a polymer high-pressure jet grouting pile 14 in each of the drilled holes 17, in order to compact and reinforce the soil mass.

In this embodiment, before the step S102, the landslide control method includes drilling on the diseased slope 1 to form the plurality of the drilled holes 17, inserting the dual-channel high-pressure grouting pipes into the drilled hole 17, and positioning bottoms of the dual-channel high-pressure grouting pipes at a bottom of the drilled hole 17.

In this embodiment, the two-component fast-setting expandable polymer slurries/material (including A and B components) enables the formed piles to rapidly expand and solidify to fully compact surrounding soil mass, so as to improve the shear strength of the soil mass. Meanwhile, the formed polymer high-pressure jet grouting piles 14 themselves have high shear strength, and can play a double reinforcing effect on the landslide. In this process, after the fast-setting, high-pressure, and high-expansion two-component polymer slurries are fully integrated with the surrounding soil mass, the polymer slurries rapidly solidify to form the polymer high-pressure jet grouting piles 14 with high shear strength to resist the sliding of the landslide mass.

In this embodiment, one channel ejects the polymer slurry of component A at high pressure, the other channel ejects the polymer slurry of component B at high pressure, and the slurries of components A and B are mixed at high pressure and high speed at the outlets to cut the surrounding soil mass, so that the slurries rapidly expand and solidify to form the polymer high-pressure jet grouting piles 14.

The polymer high-pressure jet grouting piles 14 have a diameter of 500 mm to 1000 mm, a pile spacing of 3 m to 5 m, and a depth of at least 1 m below a sliding surface.

S103: During the grouting, lifting the dual-channel high-pressure grouting pipes at a set speed, maintaining elevation for a set time (depending on the actual operation) when bottoms of the dual-channel high-pressure grouting pipes are located at a sliding surface 13, and then continuing to lift the dual-channel high-pressure grouting pipes.

In this embodiment, when each polymer high-pressure jet grouting pile 14 is grouted through the high-pressure jet grouting pipe, a pressure of less than or equal to 18 MPa is used for grouting.

S104: Stopping the grouting when bottom elevations of the dual-channel high-pressure grouting pipes reach the surface elevation of the diseased slope 1, thereby completing construction of the polymer high-pressure jet grouting pile 14 on the diseased slope 1.

Figure 5:
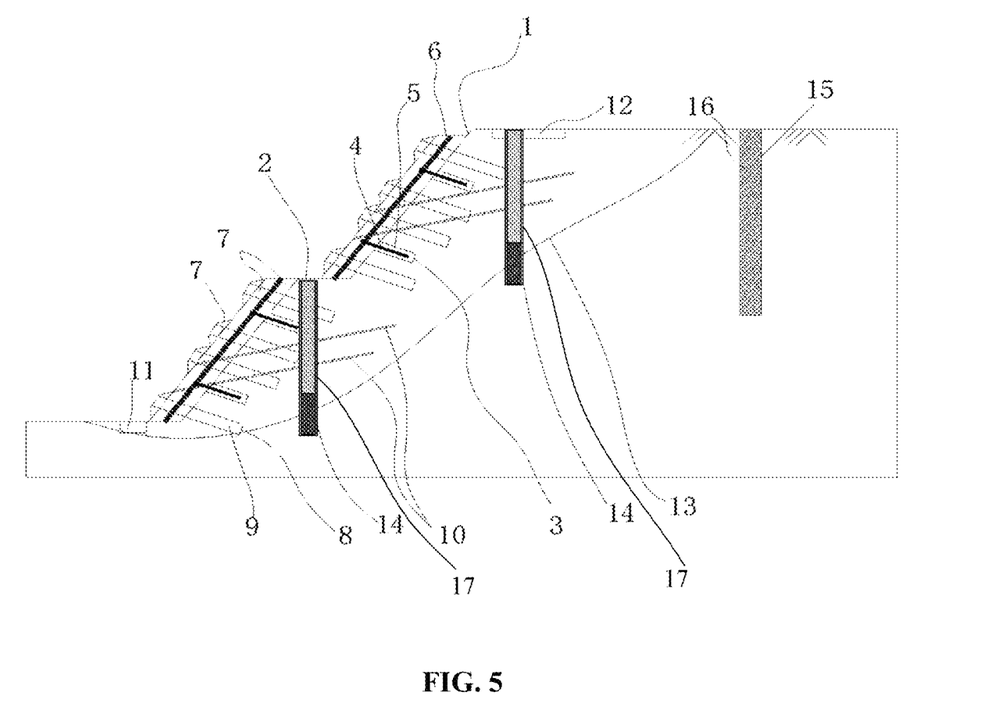
FIG. 5 is a schematic illustration of another embodiment.

In this embodiment, as shown in FIG. 5, if the stability of the slope is high, the grouting may also be stopped when the bottom elevations of the dual-channel high-pressure grouting pipes exceed the elevation of the sliding surface 13 by 3 m. At this time, the polymer high-pressure jet grouting piles 14 are not set to a full length, but are set only near the sliding surface 13, so as to support the landslide mass more economically, and the remaining portion of the drilled holes 17 are backfilled with original soil.

S105: Drilling a row of grouting water interception holes 15 on a rear edge of the diseased slope 1, wherein two of the adjacent grouting water interception holes 15 form a through connection.

Each grouting water interception hole has a spacing of less than 0.2 m so that the slurry in two adjacent holes can form splitting through, the range of the holes should exceed the width of the diseased slope 1 by more than 5 m, and the depth of the holes should exceed the sliding surface 13 downward by more than 1 m.

S106: Grouting each grouting water interception hole 15 to form an impermeable polymer water interception plate 16, wherein the thickness of the polymer water interception plate 16 is consistent with a diameter of the grouting water interception holes 15.

The polymer water interception plates 16 can isolate groundwater infiltration at the rear edge of the landslide mass and prevent the landslide mass from being further deteriorated due to the rise of the groundwater level.

So far, the deep reinforcing part (landslide control) is completed, and the surface reinforcing part (slope erosion control) is started.

Figure 2:
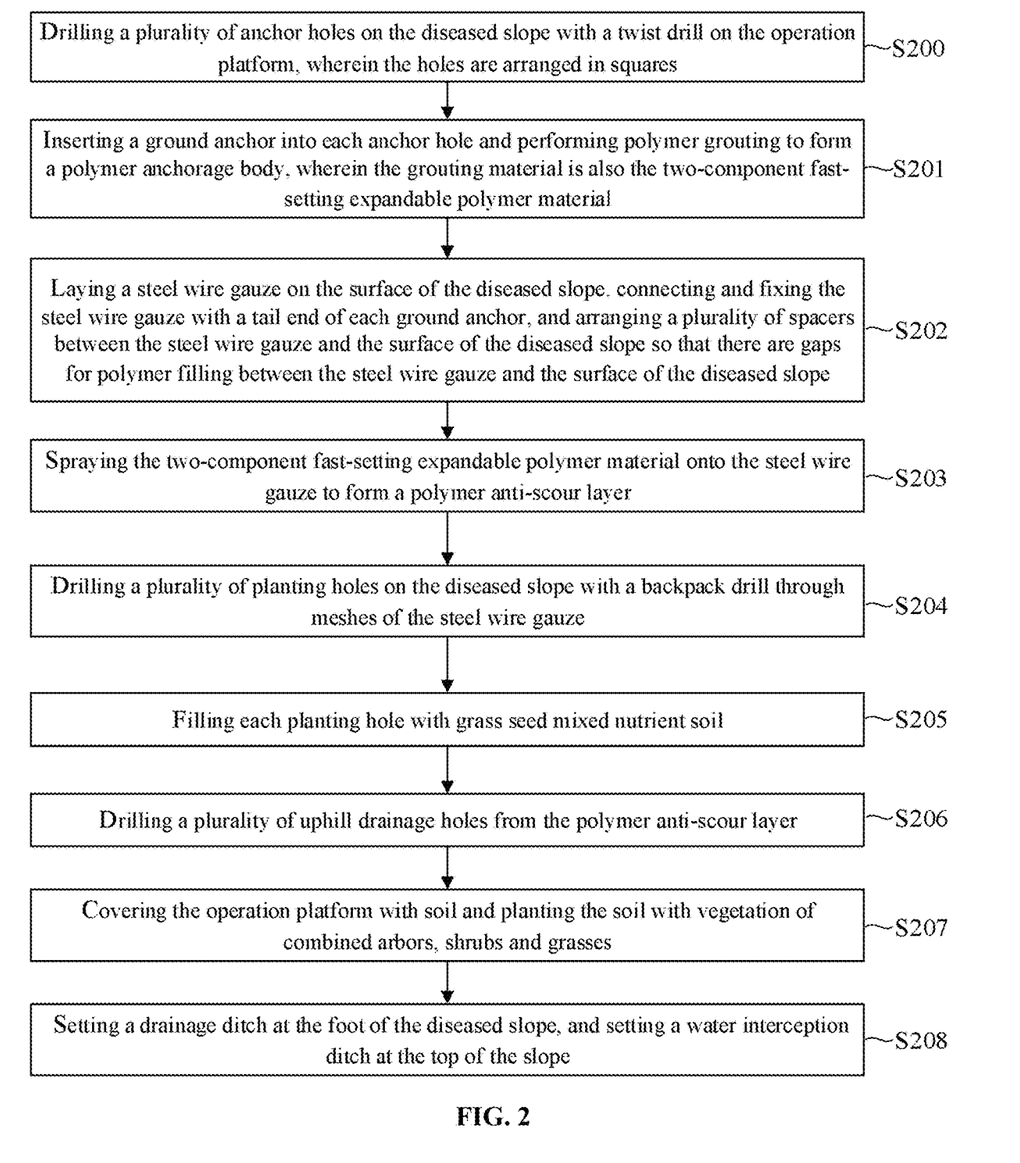
FIG. 2 is a flowchart of the slope erosion control method of the present invention.
Figure 3:
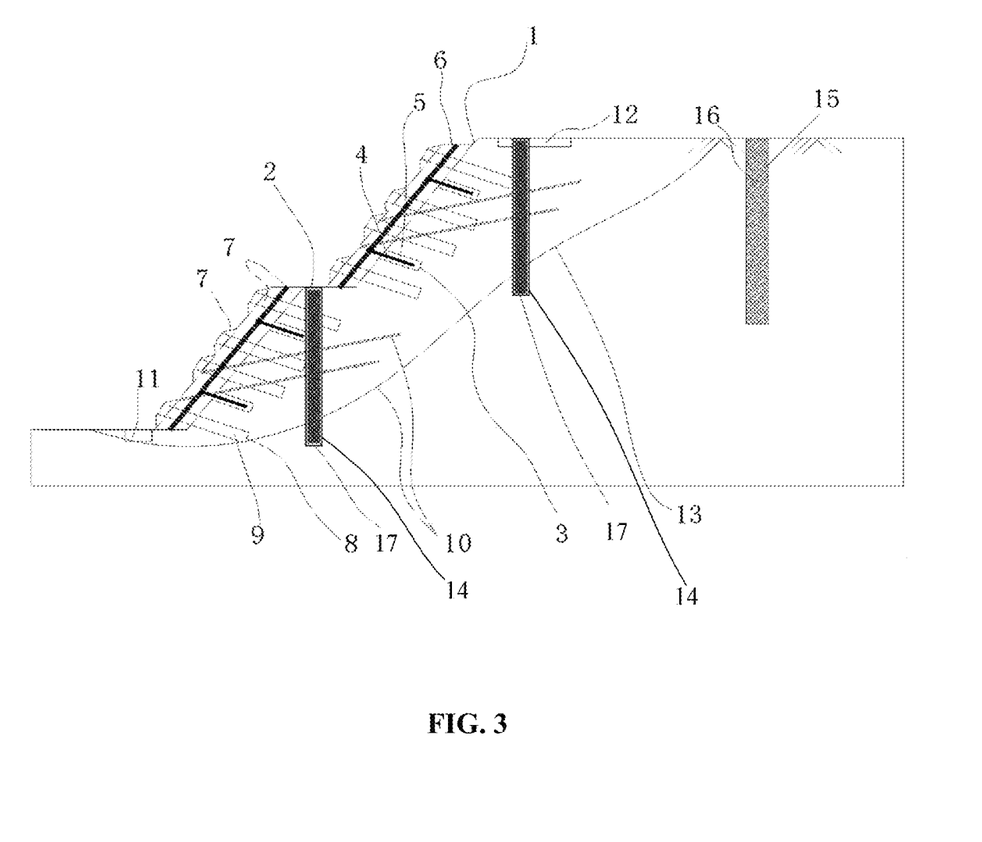
FIG. 3 is a construction structure illustration of the present invention.

With reference to FIG. 2, the slope erosion control method includes the following steps.

S200: Drilling a plurality of anchor holes 3 on the diseased slope 1 with a twist drill on the operation platform 2, wherein the holes are arranged in squares.

In this embodiment, the surface of the diseased slope 1 is drilled with the twist drill to form the plurality of anchor holes 3, with an anchoring depth of 10 cm to 30 cm, which facilitates operation. The holes are arranged in squares, with an appropriate spacing of 3 m to 5 m and an appropriate diameter of 16 mm to 32 mm, so that the subsequent ground anchors 4 can be inserted.

Slope erosion is a problem of soil and water loss, and is mainly caused by the erosion of exposed slopes by rainwater and surface water, etc., so surface protection is the key, while the anchorage depth of the ground anchors 4 does not need to be long inside the slope body on the premise that the polymer high-pressure jet grouting piles 14 have ensured the stability of the slope.

S201: Inserting a ground anchor 4 into each anchor hole 3 and performing polymer grouting to form a polymer anchorage body 5, wherein the grouting material is also the two-component fast-setting expandable polymer material.

In this embodiment, the ground anchors 4 with suitable size are inserted into the anchor holes 3, and then each anchor hole 3 is grouted with polymer by using a grouting machine.

The ground anchors 4 as the anchoring sections in the diseased slope 1 are used for the subsequent hanging of a gauze and spraying of a polymer anti-scour layer 7, which play a role of artificial rooting of the polymer anti-scour layer 7, and have an appropriate diameter of 6 mm to 12 mm and an anchoring depth of 10 cm to 30 cm. Slope erosion is a problem of soil and water loss, and is mainly caused by the erosion of exposed slopes by rainwater and surface water, etc., so surface protection is the key, while the anchorage depth of the ground anchors 4 does not need to be long inside the slope body on the premise that the polymer high-pressure jet grouting piles 14 have ensured the stability of the slope.

The polymer anchorage bodies 5 are grouted with the two-component fast-setting expandable polymer material to provide anchoring force for the ground anchors 4 in the diseased slope 1. The polymer grouting material has the advantages of fast setting (about 10 seconds at the fastest rate), durability, light weight (no additional adverse effects on fragile diseased slope 1), high expansion (can enhance the adhesive strength of the anchors), no water (does not reduce the stability of the soil mass), impermeability (anti-scour), and strong cohesion (can be firmly adhered to the surface of the diseased slope 1, to achieve an anti-scour effect).

Figure 4:
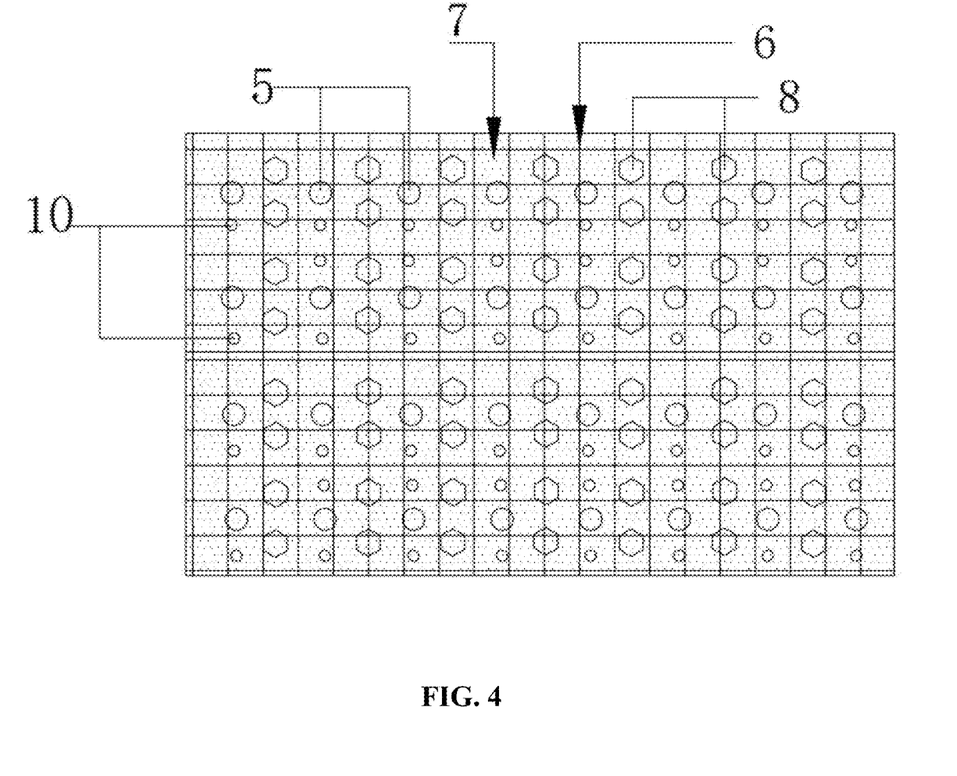
FIG. 4 is a schematic laying illustration of a steel wire gauze in FIG. 3.

S202: After the polymer anchorage bodies 5 reach a certain strength, laying a steel wire gauze 6 on the surface of the diseased slope 1, connecting and fixing the steel wire gauze 6 with a tail end of each ground anchor 4, and arranging a plurality of spacers between the steel wire gauze 6 and the surface of the diseased slope 1 so that there are gaps for polymer filling between the steel wire gauze 6 and the surface of the diseased slope 1.

In this embodiment, the steel wire gauze 6 is used to enhance the integrity of the polymer anti-scour layer 7, and the thickness of the spacers is usually 3 cm to 5 cm.

The spacers, which are wrapped by the polymer anchorage bodies 5 after the polymer anchorage bodies 5 are formed, are not shown in the drawings.

S203: Spraying the two-component fast-setting expandable polymer material onto the steel wire gauze 6 to form a polymer anti-scour layer 7.

In this embodiment, the two-component fast-setting expandable polymer material is sprayed onto the steel wire gauze 6 with a spraying machine to form the polymer anti-scour layer 7. The polymer covers most of the surface of the diseased slope 1 by about 5 cm, so as to save the consumption of the grouting material. Part of the polymer is filled in the gaps generated in step S202, so that both the inner and outer sides of the steel wire gauze 6 have the polymer anti-scour layer 7, and the steel wire gauze 6 is fixed with the slope more firmly. The polymer can be thickened to about 10 cm on the surrounding of subsequent planting holes 8, so that the planting holes 8 can be effectively protected by the polymer anti-scour layer 7.

The polymer anti-scour layer 7 has a certain thickness and strength, and plays a role in protecting the orifices of the planting holes 8, so that the planting holes 8 directly become natural greening containers, which can store grass seed mixed nutrient soil 9 and water. In addition, the locally thickened polymer anti-scour layer 7 also plays a role in increasing the depth of the planting holes 8, which further facilitates the rooting and growth of vegetation.

S204: Drilling a plurality of planting holes 8 on the diseased slope 1 with a backpack drill through meshes of the steel wire gauze 6.

In this embodiment, after the polymer anti-scour layer 7 is solidified, the planting holes 8 are drilled with the portable backpack drill, which is achieved by finely adjusting hole locations to pass through the meshes of the steel wire gauze 6, so the drilling is more convenient. The holes are arranged in rectangles, with a spacing of 1 m to 5 m and a diameter of about 10 cm. According to the experience that the root system of general herbaceous vegetation has a depth of 20 cm to 30 cm and the root system of shrubs has a depth of about 40 cm, the hole depth of 30 cm to 60 cm (excluding the polymer anti-scour layer 7 with a thickness of 10 cm) is enough for the rooting and growth of general grasses and shrubs.

S205: Filling each planting hole 8 with grass seed mixed nutrient soil 9.

In this embodiment, the planting holes 8 are filled with the grass seed mixed nutrient soil 9 or shrub grass seed mixed nutrient soil 9. The grass seeds should be of native species, preferably with developed root system, drought tolerance, barren tolerance, strong stress resistance, and forms and specifications meeting the design requirements. The planting soil is appropriately added with organic matters, fertilizers, water-retaining agents, etc. to meet the nutritional needs of vegetation development.

S206: Drilling a plurality of uphill drainage holes 10 from the polymer anti-scour layer 7.

In this embodiment, in view of the impermeability of the polymer anti-scour layer 7, in order to prevent the diseased slope 1 from being further deteriorated due to the rise of the groundwater level in the rainy season, some uphill drainage holes 10 should be drilled from the polymer anti-scour layer 7, which is also achieved by finely adjusting hole locations to pass through the meshes of the steel wire gauze 6, so the drilling is more convenient. The vertical and horizontal hole spacing is 3 m to 6 m, and the holes are arranged in a quincunx or rectangular shape, to facilitate the drainage of excessive groundwater in the rainy season. Generally, 1 row to 2 rows of uphill drainage holes are drilled for each level of the slope.

S207: Appropriately covering the operation platform 2 with soil according to the specific situation, and then planting the solid with vegetation of combined arbors, shrubs and grasses. Arbors, shrubs, and climbing plants that "climb up and hang down" can be planted on the operation platform 2 according to a certain proportion to construct diversified vegetation communities, so as to promote the stability of artificial planting ecological environment, ensure the smooth implementation of re-greening projects, and improve the possibility and ecology of successful slope erosion control.

S208: Setting a drainage ditch 11 at the foot of the diseased slope 1, and setting a water interception ditch 12 at the top of the slope, or combining with traditional water interception and drainage measures, such as reservoirs, which can reduce surface runoff, alleviate hydraulic erosion, ensure the overall stability of the polymer anti-scour layer 7, and create certain maintenance conditions for the later growth of slope vegetation.

The unspecified part of the present invention is the prior art, and therefore is not described in detail in the present invention.

It can be understood that the term "a" should be understood as "at least one" or "one or more", that is, in one embodiment, the number of an element may be one, and in another embodiment, the number of the element may be more than one, so the term "one" cannot be understood as a restriction on the number.

Although the terms such as diseased slope 1, operation platform 2, anchor hole 3, ground anchor 4, polymer anchorage body 5, steel wire gauze 6, polymer anti-scour layer 7, planting hole 8, grass seed mixed nutrient soil 9, uphill drainage hole 10, drainage ditch 11, water interception ditch 12, sliding surface 13, polymer high-pressure jet grouting pile 14, grouting water interception hole 15, and polymer water interception plate 16 are used more here, the possibility of using other terms is not excluded. These terms are used only to describe and explain the essence of the present invention more conveniently, and to interpret them as any additional limitation is contrary to the spirit of the present invention.

The present invention is not limited to the above best embodiments. Any person can derive other products in various forms under the enlightenment of the present invention. However, regardless of any change in shape or structure, all other technical solutions that are the same or similar to the technical solutions of the present application shall fall within the protection scope of the present invention.

We claim:

1. A construction method of fast-setting polymer grouting for rapid control of slope erosion and landslide, the construction method comprising a landslide control method and a slope erosion control method, wherein
the landslide control method comprises the following steps:
cleaning a diseased slope to form an operation platform;
positioning a polymer high-pressure jet grouting pile machine with dual-channel high-pressure grouting pipes on the operation platform;
ejecting two-component fast-setting expandable polymer slurries from two channel outlets respectively of the dual-channel high-pressure grouting pipes, and grouting the two-component fast-setting expandable polymer slurries to each of a plurality of drilled holes on the diseased slope, to cut surrounding soil mass around the drilled hole, so that the polymer slurries rapidly expand and solidify to form a polymer high-pressure jet grouting pile in each of the drilled holes, in order to compact and reinforce the soil mass;
during the grouting, lifting the dual-channel high-pressure grouting pipes at a set speed, maintaining elevation for a set time when bottoms of the dual-channel high-pressure grouting pipes are located at a sliding surface, and then continuing to lift the dual-channel high-pressure grouting pipes;
stopping the grouting when bottom elevations of the dual-channel high-pressure grouting pipes reach the surface elevation of the diseased slope, thereby completing construction of the polymer high-pressure jet grouting pile on the diseased slope;
drilling a row of grouting water interception holes on a rear edge of the diseased slope, wherein two of the adjacent grouting water interception holes form a through connection; and
grouting each grouting water interception hole to form an impermeable polymer water interception plate, wherein the thickness of the polymer water interception plate is consistent with a diameter of the grouting water interception holes;
wherein the slope erosion control method comprises the following steps:
drilling a plurality of anchor holes on the diseased slope with a twist drill on the operation platform, wherein the holes are arranged in squares;
inserting a ground anchor into each anchor hole and performing polymer grouting to form a polymer anchorage body, wherein the grouting material is also the two-component fast-setting expandable polymer material;
laying a steel wire gauze on the surface of the diseased slope, connecting and fixing the steel wire gauze with a tail end of each ground anchor, and arranging a plurality of spacers between the steel wire gauze and the surface of the diseased slope so that there are gaps for polymer filling between the steel wire gauze and the surface of the diseased slope;

spraying the two-component fast-setting expandable polymer material onto the steel wire gauze to form a polymer anti-scour layer;

drilling a plurality of planting holes on the diseased slope with a backpack drill through meshes of the steel wire gauze;

filling each planting hole with grass seed mixed nutrient soil; and drilling a plurality of uphill drainage holes from the polymer anti-scour layer.

2. The construction method of fast-setting polymer grouting for rapid control of slope erosion and landslide according to claim 1, further comprising covering the operation platform with soil and planting the soil with vegetation of combined arbors, shrubs and grasses, wherein the combined arbors, shrubs and grasses at least comprise arbors, shrubs, herbs and vines.

3. The construction method of fast-setting polymer grouting for rapid control of slope erosion and landslide according to claim 1, wherein the spacing between two adjacent anchor holes is 3 m to 5 m, and each anchor hole has a diameter of 16 mm to 32 mm and a depth of 10 cm to 30 cm; and the planting holes are arranged in rectangles, with a spacing of 1 m to 5 m, a diameter of 10 cm, and a depth of 30 cm to 60 cm.

4. The construction method of fast-setting polymer grouting for rapid control of slope erosion and landslide according to claim 1, wherein the operation platform comprises at least two operation platforms, the height distance between two adjacent operation platforms is 6 m to 8 m, and the width of each slope operation platform is 3 m to 5 m, for the operation of the polymer high-pressure jet grouting pile machine.

5. The construction method of fast-setting polymer grouting for rapid control of slope erosion and landslide according to claim 1, wherein the uphill drainage holes are drilled through the meshes of the steel wire gauze and arranged in a quincunx or rectangular shape with a vertical and horizontal spacing of 3 m to 6 m, and the uphill drainage holes avoid the pile locations of the polymer high-pressure jet grouting piles.

6. The construction method of fast-setting polymer grouting for rapid control of slope erosion and landslide according to claim 1, wherein the polymer anti-scour layer has a thickness of 5 cm, and the polymer anti-scour layer around the planting holes is thickened to 10 cm.

7. The construction method of fast-setting polymer grouting for rapid control of slope erosion and landslide according to claim 1, further comprising setting a drainage ditch at the foot of the diseased slope, and setting a water interception ditch at the top of the slope.

8. The construction method of fast-setting polymer grouting for rapid control of slope erosion and landslide according to claim 1, wherein the polymer high-pressure jet grouting piles have a diameter of 500 mm to 1000 mm, a pile spacing of 3 m to 5 m, and a depth of at least 1 m below a sliding surface.

9. The construction method of fast-setting polymer grouting for rapid control of slope erosion and landslide according to claim 1, wherein when each high-pressure jet grouting pile is grouted through the high-pressure jet grouting pipe, a pressure of less than or equal to 18 MPa is used for grouting.

10. The construction method of fast-setting polymer grouting for rapid control of slope erosion and landslide according to claim 1, wherein each grouting water interception hole has a spacing of less than 0.2 m and a depth of at least 1 m below the sliding surface.

* * * * *